(12) United States Patent
Kim et al.

(10) Patent No.: US 6,389,020 B1
(45) Date of Patent: May 14, 2002

(54) CUSTOMER PREMISE NETWORK EQUIPMENT AND DATA COMMUNICATION METHOD BASED ON SINGLE RING CONFIGURATION

(75) Inventors: Jong Oh Kim; Kyu Ho Lee; Bong Tae Kim, all of Daejeon (KR)

(73) Assignees: Electronics and Telecommunications Research Institute, Daejeon; Korea Telecom, Seoul, both of (KR)

(*) Notice: Subject to any disclaimer, the term of this patent is extended or adjusted under 35 U.S.C. 154(b) by 0 days.

(21) Appl. No.: 09/133,465

(22) Filed: Aug. 13, 1998

(30) Foreign Application Priority Data

Sep. 4, 1997 (KR) .............................. 97-45739

(51) Int. Cl.[7] .......................... H04L 12/28; H04J 3/16; H04J 3/02
(52) U.S. Cl. ..................... 370/395; 370/469; 370/539
(58) Field of Search ................. 370/222, 258, 370/395, 437, 465, 466, 467, 535, 539, 541

(56) References Cited

U.S. PATENT DOCUMENTS 6,034,954 A * 3/2000 Takase et al. ............... 370/362
6,073,180 A * 6/2000 Onoda et al. ............... 709/234
6,233,074 B1 * 5/2001 Lahat et al. ................ 359/118
6,256,292 B1 * 7/2001 Ellis et al. .................. 370/227
6,266,343 B1 * 7/2001 Caves ......................... 370/466
6,320,860 B1 * 11/2001 Hurlocker ................... 370/395
6,323,975 B1 * 11/2001 Kurki .......................... 359/127

OTHER PUBLICATIONS

Ernst–Heinrich Goeldner et al., "Multiple Access for BISDN", Aug., 1991, pp. 37–43.
W. Denzel et al., "Shared–Medium–Based Subscriber Ring Access to ATM Networks", Apr., 1995, pp. 452–456.

* cited by examiner

*Primary Examiner*—Wellington Chin
*Assistant Examiner*—Brenda Pham
(74) *Attorney, Agent, or Firm*—Cohen, Pontani, Lieberman & Pavane

(57) ABSTRACT

A customer premise network equipment and a data communication method based on a single ring configuration are disclosed. The equipment includes a plurality of subscriber terminals connected one-to-one or one-to-multiple or a broadcasting type between a network and a subscriber by a single ring, and a customer premise network terminal equipment connected by a single ring for receiving an one-to-one protocol and implementing a communication between the subscriber terminals and an access between the subscriber terminal and the network.

13 Claims, 10 Drawing Sheets

⊕ : ADD   ⊖▶ : RELAY
⊕▶ : COPY

⊕ :DROP

CUSTOMER PREMISE NETWORK EQUIPMENT AND DATA COMMUNICATION METHOD BASED ON SINGLE RING CONFIGURATION

BACKGROUND OF THE INVENTION

1. Field of the Invention

The present invention relates to a customer premise network equipment and a data communication method based on a single ring configuration, and in particular, to an improved customer premise network equipment and a data communication method based on a single ring configuration which are capable of providing a low cost broad band service for a personal customer and a small size business office by configuring a plurality of terminal networks based on a single ring network.

2. Description of the Prior Art

As the communication technology is advanced, a B-ISDN (Broadband Integrated Service Digital Network) of an ATM method is used so that a burst service of a real time video signal transmitting and receiving operation having a high speed data transmission and variable bit rate such as a continuous service for an audio or video signal is implemented in the identical link.

The development of the equipment for configuring the above-described B-ISDN is focussed on a medium size equipment which is capable of providing a broadband service for a large capacity switch operation and private network and a plurality of areas rather than for the equipment capable of providing a service to a customer premise network or a subscriber. Most of the above-described equipments are developed in a switch structure for being adapted to a traffic transmitting and receiving operation between areas in which a large input and output capacity is needed. However, the above-described equipments have the following problems for being used for a customer premise or a small size business office compared to a multi-access configuration of a ring or bus structure.

First, when the equipment of a switch structure is connected with each service terminal by a transmission line, since the switch should be connected with each terminal one-to-one, the transmission line is increased compared to the ring or bus type for thereby increasing a fabrication cost of the system.

Second, since a complicated switch structure is used, it is difficult to maintain and manage the system compared to a simple multi-access equipment or a ring type equipment.

Third, when it is needed to increase the system of an input port, in the multi-access, the terminal is installed between the previous terminal or a terminal and another terminal. However, in the switch type access, since the port should be installed by the switch unit for increasing the system of the port, a fabrication cost is increased.

The conventional customer premise network equipment will be explained with reference to the accompanying drawings.

FIG. 1 is a view illustrating the construction of a one-to-one type customer premise network in the conventional art, and FIG. 2 is a block diagram illustrating a one-to-one type customer premise network equipment in the conventional art.

Generally, a customer premise network requires a broadband network terminal equipment for terminating a network protocol in order to provide a customer premise and a small size office with a broadband service for thereby providing the service to the customer and supporting an internal communication between the customers.

As shown in FIG. 1, the conventional customer premise network configured based on a one-to-one connection includes a plurality of customer terminals 10 supplying a broadband service, and a customer premise network terminal equipment 20 terminating a network protocol from a terminal switch 30 of the network or other network equipments, instructing each of the customer terminals 10 to receive or transmit data from the network and supporting a communication with each of the customer terminals 10. At this time, the customer terminal 10 and the customer premise terminal equipment 20 are connected with a double shielding line supporting a STM-1 line or an ATM-25, and each line is configured to be connected with the customer premise network equipment 20 one-to-one. Therefore, the above-described ring configuration has a problem in that a lengthy line is needed compared to the ring type connection.

As shown in FIG. 2, the customer premise network terminal equipment 20 includes a network side line card 23 terminating a protocol from the network and supporting a physical hierarchial access, a customer side line card 21 supporting a physical medium access of each customer terminal and an ATM hierarchial protocol, a switch 22 supporting a communication between the customers and transferring a data between the customer and the network, and a control board 24 controlling the function boards 21, 22 and 23 and maintaining a control board 24. With the thusly constituted structure, when each customer requests a data transfer, the data is header-converted by the customer side line card 21 and then is transferred to the switch 22. The switch 22 uses a routing fielder or a header and determines the routing direction of each cell. The data which is requested a transfer by the routing of the switch 22 is transferred to another customer side line card 21 or the network side line card 23 connected with the network. At this time, since the customer premise network terminal equipment 20 can provide each customer with a maximum transmission speed service which is available on the line, the terminal connected with the customer premise network terminal equipment 20 does not affect another terminal when the terminal is not properly operated during the operation of the system. However, the ports are purchased by the unit of the customer premise network terminal equipment 20 irrespective of the number of the terminals needed in the customer premise, a fabrication cost is increased. In addition, when connecting the terminal more than the number of the support ports of the switch, the identical broadband customer premise network terminal apparatus 20 is needed for thereby increasing a fabrication cost of the system.

SUMMARY OF THE INVENTION

Accordingly, it is an object of the present invention to provide a customer premise network equipment and a data communication method based on a single ring configuration which overcome the aforementioned problems encountered in the conventional art.

It is another object of the present invention to provide a customer premise network equipment and a data communication method based on a single ring configuration which are capable of providing a B-ISDN (Broadband Integrated Service Digital Network) at a low cost, so that the B-ISDN is available for a customer premise and a small size business office.

In order to achieve the above objects, there is provided a customer premise network equipment based on a single ring configuration which includes a plurality of subscriber terminals connected one-to-one or one-to-multiple or a broadcasting type between a network and a subscriber by a single ring, each of the subscriber terminals including a terminal controller controlling a protocol and an access of a signal transmitted through the subscriber terminals, a service access unit interfacing with a direct service in accordance with a control of the terminal controller, a subscriber data controller processing a data from the ring and performing a relay/drop/copy function, and an AAL processing unit matching the cell dropped by the subscriber data processing unit with a proper type of a service type, transferring the thusly matched cell to the service access unit and disassembling a service data requested by the service access unit into an ATM cell type, and each of the subscriber terminal including a drop function for transferring a data from an ATM hierarchy to an upper hierarchy, an add function for transferring the data from the upper hierarchy to the ATM hierarchy, a relay function for feeding-back the data from the ATM hierarchy to a physical hierarchy, and a copy function for concurrently performing the drop and relay functions; and a customer premise network terminal equipment connected by a single ring for receiving an one-to-one protocol and implementing a communication between the subscriber terminals and an access between the subscriber terminal and the network.

In order to achieve the above objects, there is provided a data communication method based on a single ring configuration which includes the steps of a first step in which when a set access is a one-to-one communication access and an access between a subscriber and a network an access information table of the subscriber oriented processing unit and the network oriented processing unit of the customer premise network terminal equipment is set as a remote relay and a subscriber data processing unit is set to a drop, a second step in which when a set access is a one-to-one communication and an access between subscribers the access information table of the subscriber oriented processing unit is set to a local relay, and the subscriber data processing unit is set to a drop, a third step in which when a set access is a one-to-one access and an access from the network to the subscriber orientation the network oriented processing unit is a remote relay, and the subscriber data processing unit of each subscriber terminal is a copy, and a fourth step when a set access is a one-to-one access, and a subscriber terminal is a data source to which a data is added, and is an access between the subscribers, having a sub-fourth step in which when there is not a data which is transferred to a subscriber terminal through a customer premise network equipment in a ring of a customer premise network, namely, when a subscriber terminal is a data generation source to which a data is added and is routed to a station switch through a subscriber terminal, the subscriber oriented processing unit is set to a remote relay, the subscriber terminal of a one-to-one access is set to a relay, namely, set to a copy, and the terminal which is not allocated for a one-to-one access is set to a relay, and a sub-fourth step in which when there is a data which is transferred to the subscriber terminal through a customer premise network terminal equipment in a ring of a customer premise network, namely, when a subscriber terminal is a data generation source to which a data is added, and a data is routed to the terminal through the customer premise network terminal equipment, the terminal being nearest the subscriber terminal which is a data generation source from the customer premise network equipment among the subscriber terminals of a one-to-one access performs a drop function, and the remaining subscriber terminals performs a copy function, and the terminals which is not connected based on the copy function performs a relay function.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
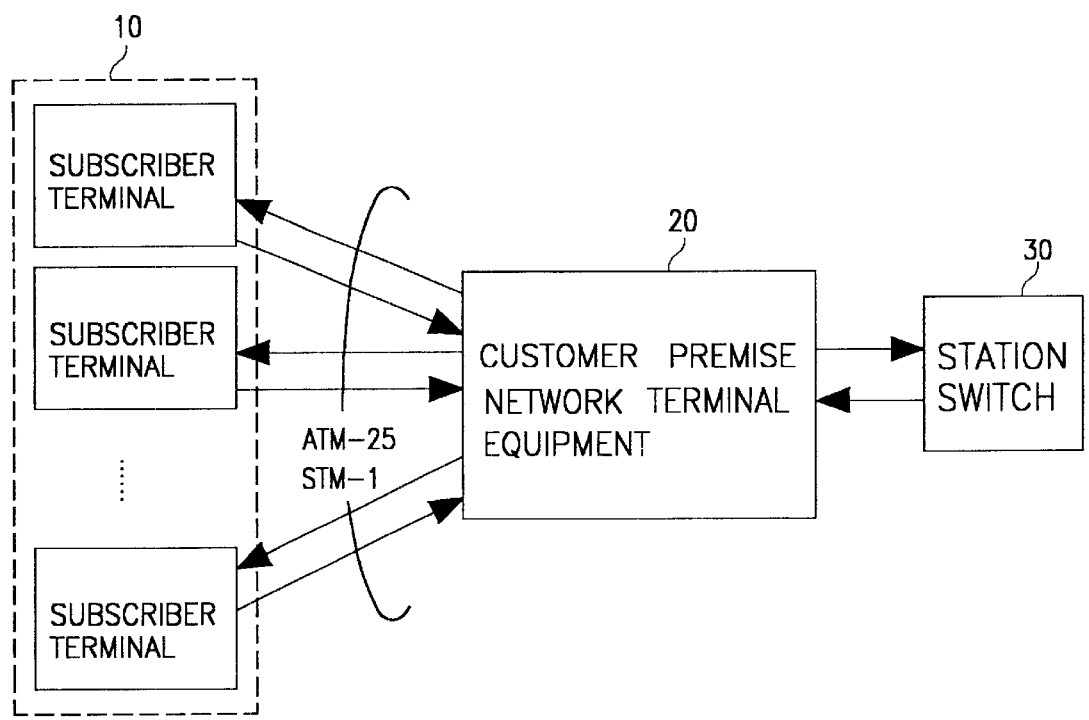
FIG. 1 is a view illustrating the construction of a one-to-one type customer premise network in the conventional art.
Figure 2:
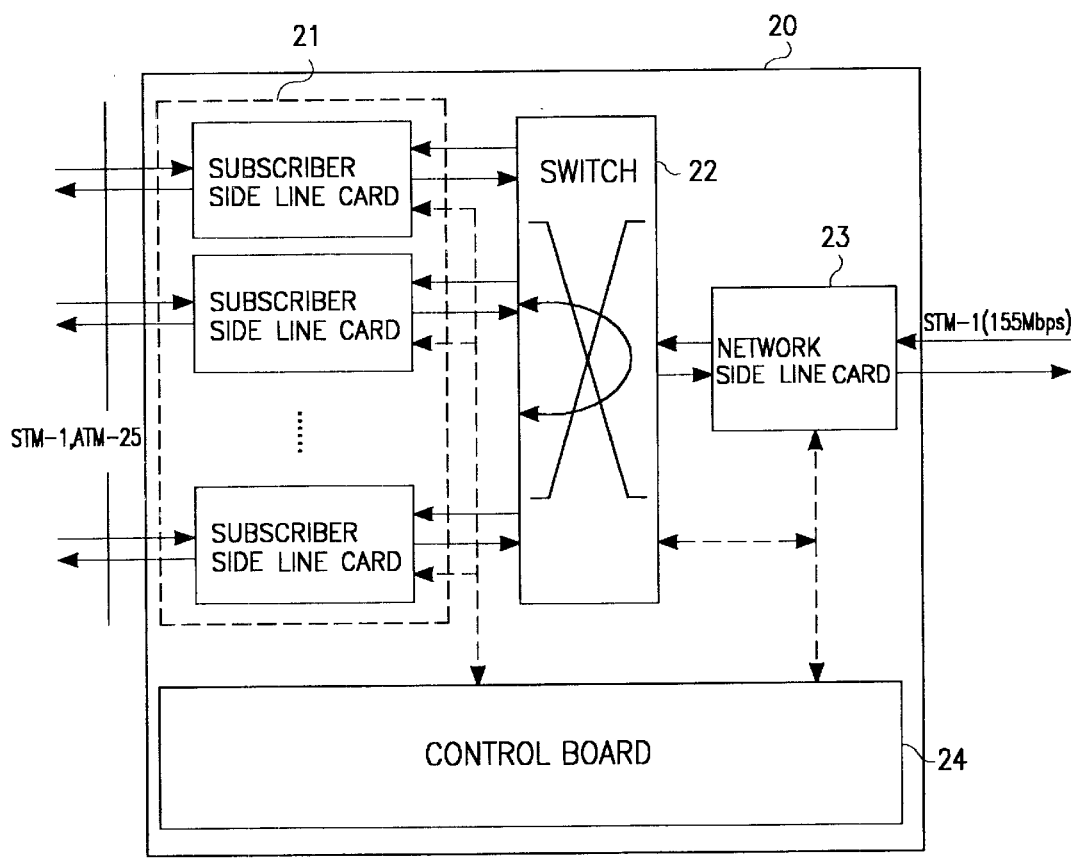
FIG. 2 is a block diagram illustrating a one-to-one type customer premise network equipment in the conventional art.
Figure 3:
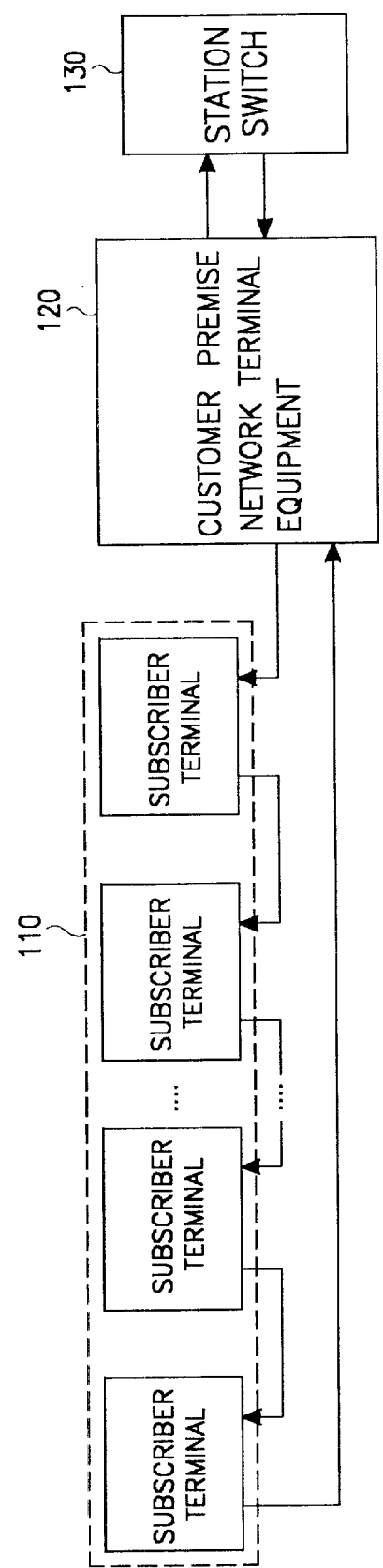
FIG. 3 is a view illustrating the construction of a single ring configuration customer premise network according to a first embodiment of the present invention.
Figure 4:
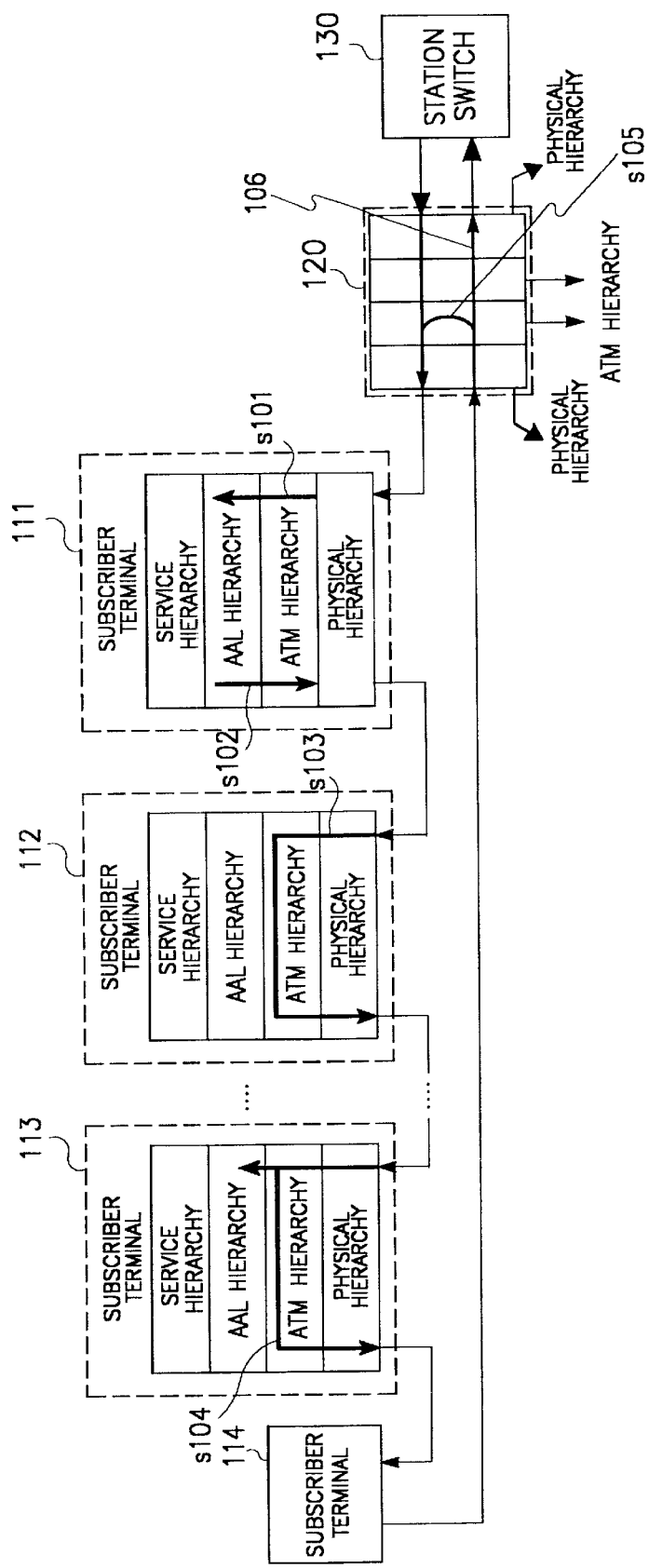
FIG. 4 is a view illustrating a single ring configuration customer premise network data transmitting and receiving method according to the present invention.
Figure 5:
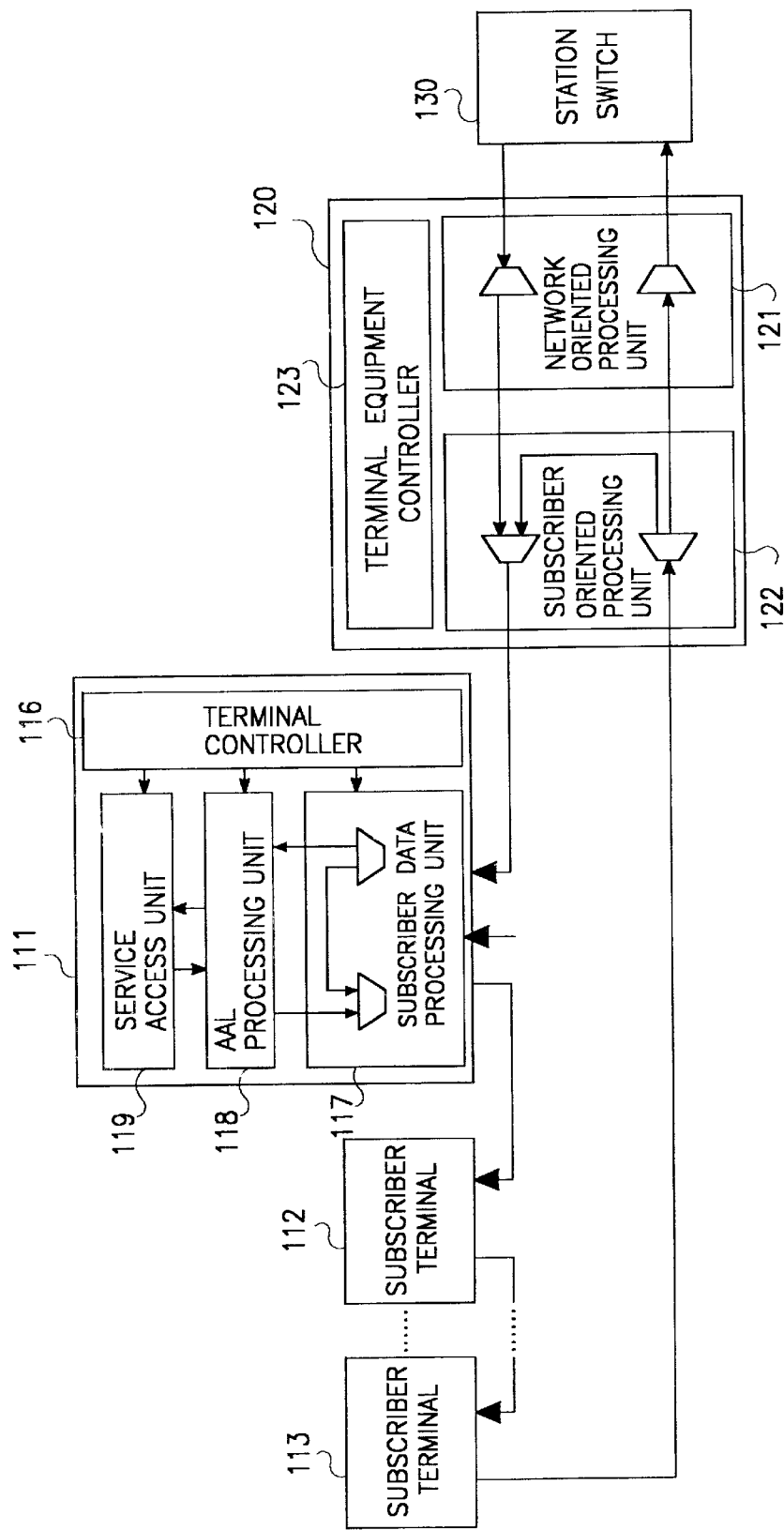
FIG. 5 is a block diagram illustrating an equipment supporting a single ring configuration according to the present invention.
Figure 6:
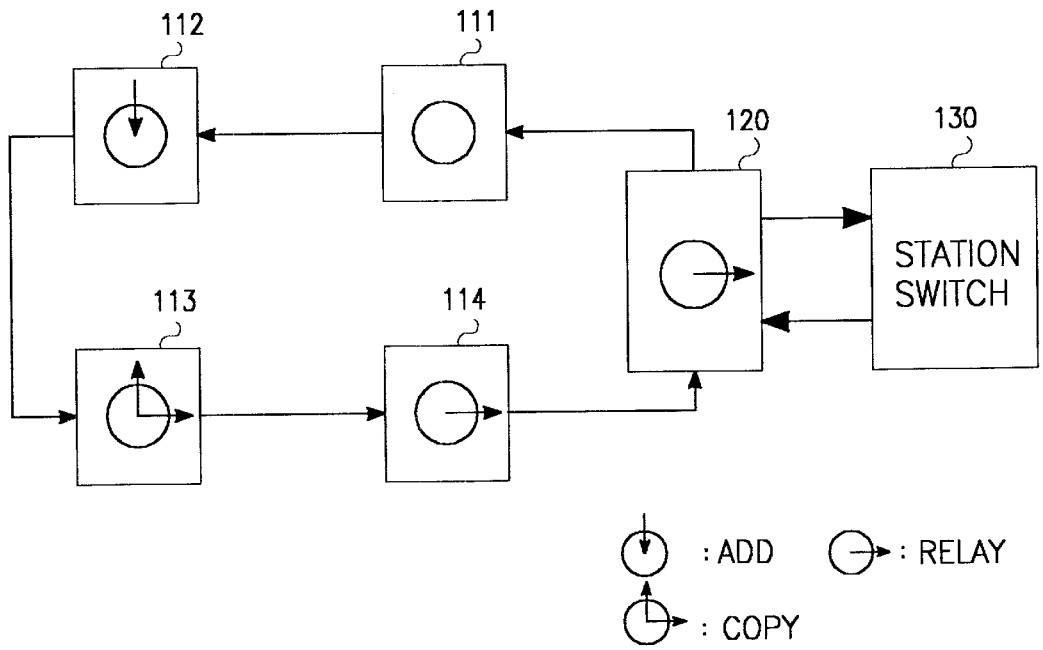
FIG. 6 is a view illustrating a data flow in a one-to-multiple access according to the present invention.
Figure 7:
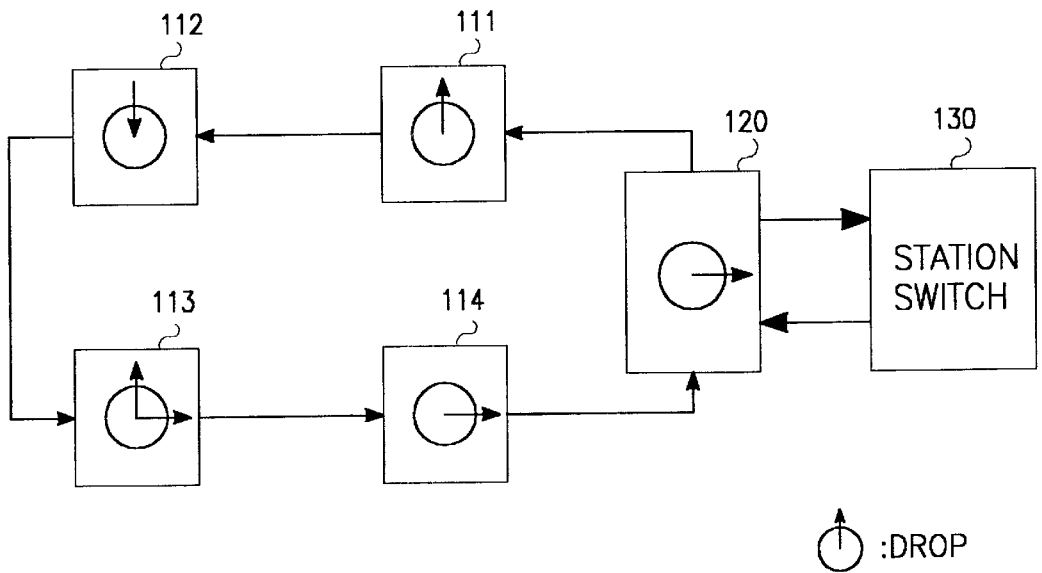
FIG. 7 is a view illustrating a data flow in a one-to-multiple access according to another embodiment of the present invention.
Figure 8:
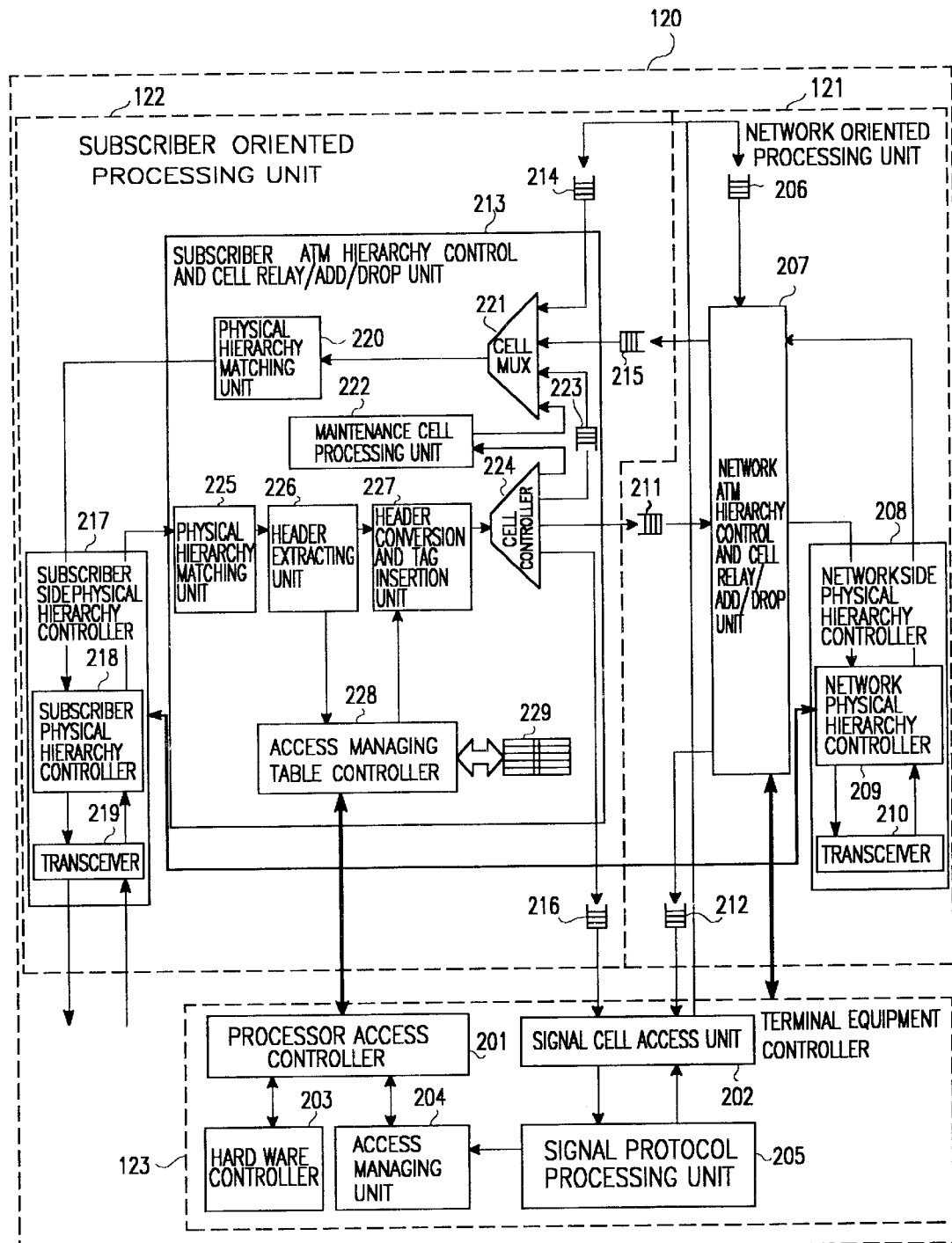
FIG. 8 is a block diagram illustrating a broadband network terminal equipment according to the present invention.
Figure 9:
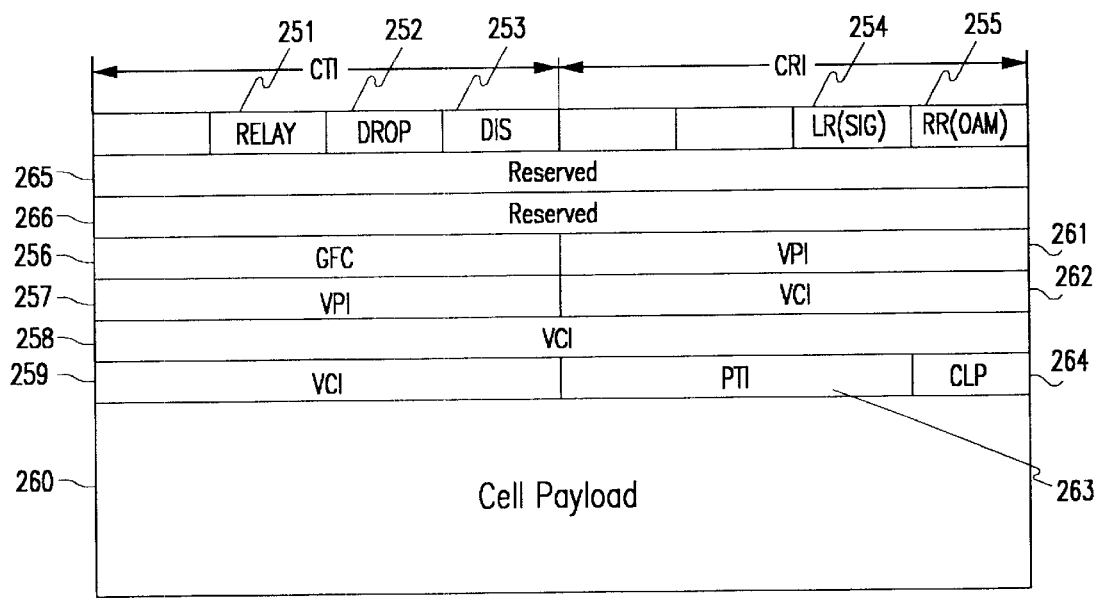
FIG. 9 is a view illustrating the construction of a data format for supporting a cell relay/add/drop operation for a broadband network terminal equipment according to the present invention.
Figure 10:
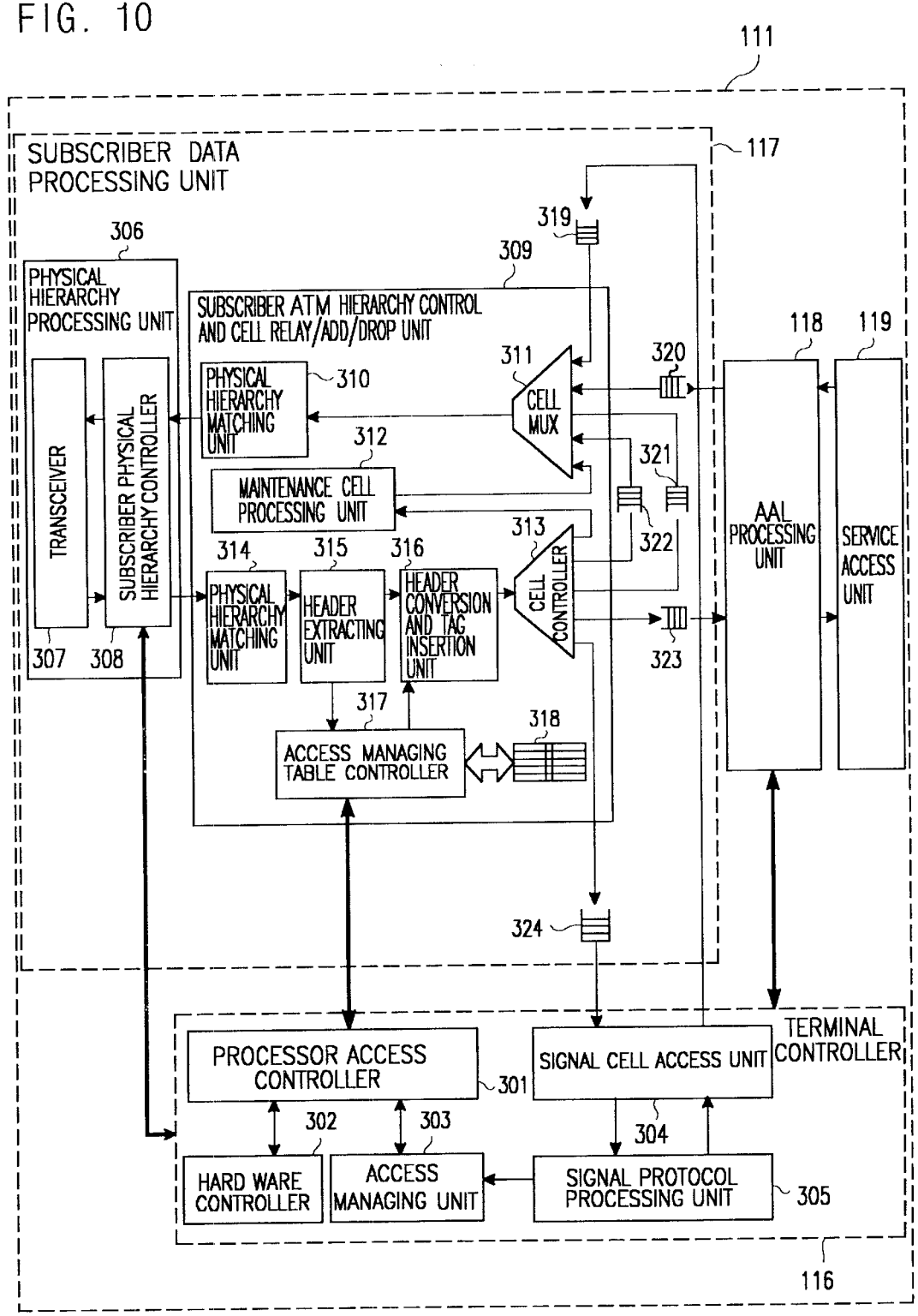
FIG. 10 is a block diagram illustrating a customer premise network according to the present invention.
Figure 11:
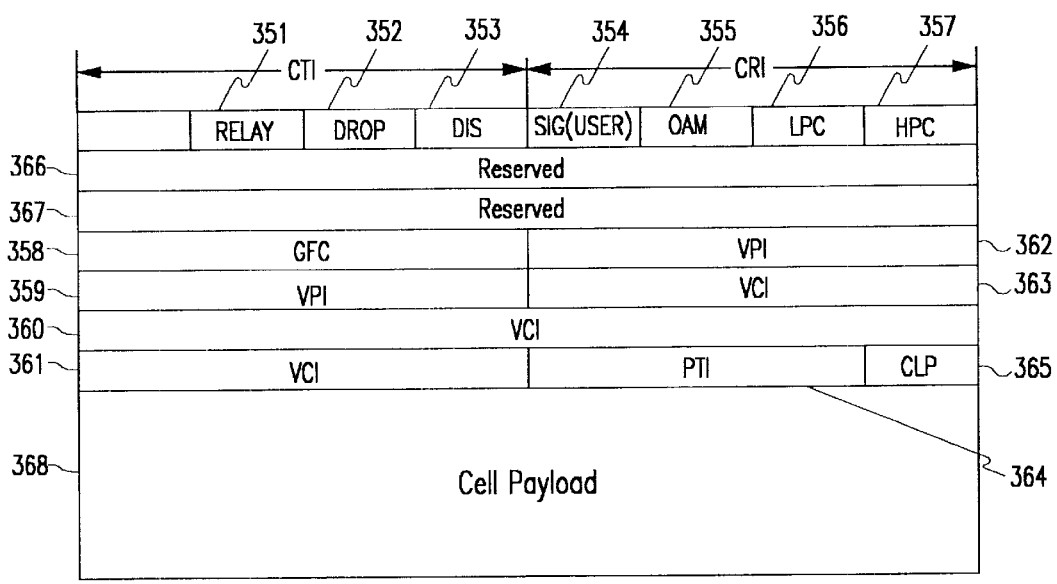
FIG. 11 is a view illustrating a data format for supporting a cell relay/add/drop operation for a customer premise network according to the present invention.

FIG. 3 illustrates the construction of a single ring configuration customer premise network according to a first embodiment of the present invention, FIG. 4 illustrates a single ring configuration customer premise network data transmitting and receiving method according to the present invention, FIG. 5 illustrates an equipment supporting a single ring configuration according to the present invention, FIG. 6 illustrates a data flow in a one-to-multiple access according to the present invention, FIG. 7 illustrates a data flow in a one-to multiple access according to another embodiment of the present invention, FIG. 8 illustrates a broadband network terminal equipment according to the present invention, FIG. 9 illustrates the construction of a data format for supporting a cell relay/add/drop operation for a broadband network terminal equipment according to the present invention, FIG. 10 illustrates a customer premise network according to the present invention, and FIG. 11 illustrates a data format for supporting a cell relay/add/drop operation for a customer premise network according to the present invention.

As shown in FIG. 3, the customer premise network according to a first embodiment of the present invention includes a plurality of subscriber networks 110 connected by a single ring, and a customer premise network terminal equipment 120 communicating with a station switch 130, performing a one-to-one protocol and supporting a communication between the subscriber terminals and a connection between the subscriber terminal and the network. At this time, in order to implement a communication between the subscriber terminals 110 using a single ring, a ring protocol is needed. In the present invention, a ring protocol is implemented using a header conversion function and a cell routing function of an ATM hierarchy.

As shown in FIG. 4, the communication with or internal communication between the subscriber terminals 111, 112, 113 and 114 are implemented by the drop S101, the add S102, the relay S103 or the copy S104.

At this time, the above-described four functions are performed by the ATM hierarchy. As explained in the description of the subscriber terminal 111, the drop S101 represents a data transfer from the ATM hierarchy to the upper hierarchy, and the ADD S102 represents a data transfer from the upper hierarchy (AAL hierarchy) to the ATM hierarchy. In addition, the relay S103 represents a feed back from the ATM hierarchy to the physical hierarchy, and the copy S104 represents a function performing the drop S101 and the relay S103.

In addition, the relay S103 of the customer premise network terminal equipment 120 is classified into the local relay S105 and the remote relay S106. The local relay S105 represents that the inputted cell is transferred to the ring for supporting an internal communication between the subscriber terminals 111, 112, 113 and 114. The remote relay S106 is implemented for the data transmitting and receiving operation between the subscriber and the network. The data requesting a transfer from the base station 130 to the network represents that the data are transmitted to the subscriber terminals 111, 112, 113 and 114. In addition, the internal communication between the terminals and the external communication between the terminal and the network are implemented by a combination between the add S102/drop S101/relay S103/copy S104. A one-to-multiple and broadcasting type access is implemented when each terminal identifies the destination of a corresponding cell based on a control information when setting an access, and the add S102/drop S101/relay S103/copy S104 are performed.

FIG. 5 is a block diagram illustrating an equipment supporting a single ring configuration according to the present invention. Namely, FIG. 5 illustrates the internal construction of the subscriber terminal 110 and the customer premise network terminal equipment 120 of the ring structure of FIGS. 3 and 4 according to the present invention. As shown in FIG. 5, the customer premise network terminal equipment 120 includes a subscriber oriented processing unit 122 supporting an internal communication between the network and the subscriber, transferring the data requested by the subscriber terminals 111, 112, and 113 to the network and the data from the network to each subscriber terminal and terminating a ring protocol, a network oriented processing unit 121 terminating an internetwork protocol with the station switch 130, transferring the data which requests a transfer from the network to each subscriber or the data which requests a transfer from each subscriber to the network to the subscriber oriented processing unit 122, and transferring the data which requests a transfer from the subscriber oriented processing unit 122 to the network, and a terminal equipment controller 123 controlling the operation of the network oriented processing unit 121 and the subscriber oriented processing unit 122 and a predetermined function of the signals from the network and subscriber terminals 111, 112, and 113.

The subscriber terminals 111, 112 and 113 each include a terminal controller 116 controlling a protocol and access of the signals transmitted through the subscriber terminals 111, 112 and 113, a service access unit 119 implementing a direct interface with a service in accordance with the control of the terminal controller 116, a subscriber data processing unit 117 processing the data transferred from the ring and performing a relay/drop/copy function, and an AAL processing unit 118 matching the cell dropped by the subscriber data processing unit 117 with a service type, transferring to the service access unit 119, and disassembling the service data transferred from the service access unit 119 into an ATM cell type.

In the thusly constituted customer premise network terminal equipment 120 and the subscriber terminal 111, the terminal controller 116 of the subscriber terminal transmits and receives an information on an access setting with the terminal equipment controller 123 of the broadband network terminal equipment in accordance with a signal procedure before a data is inputted into the ring structure. When one access is set by the access setting information, the thusly set information is registered into an access information table of the subscriber oriented processing unit 122 and the network oriented processing unit 121 of the customer premise network terminal equipment 120 and the subscriber data processing unit 117 of the subscriber terminal, and the customer premise network terminal equipment 120 and the subscriber terminals 111, 112, and 113 transmit and receive data based on the type of the set access.

The method for transmitting and receiving the data will now be explained.

First, if the set access is directed to a one-to-one access between a subscriber and a network, the subscriber oriented processing unit and the network oriented processing unit of the customer premise network terminal equipment are set as a remote relay, and the subscriber data processing unit 117 is set as a drop. If the thusly set access is directed to a one-to-one access for subscribers, the access information table of the subscriber oriented processing unit 122 is set as a local relay, and the subscriber data processing unit 117 is set as a drop.

In addition, if the thusly set is directed to a one-to-multiple access between a network and a subscriber orientation, the network oriented processing unit 121 is set as a remote relay, and the subscriber data processing unit 117 of the subscriber terminal is set as a copy.

If the thusly set access is directed to a one-to-multiple access, the subscriber terminal is a data source to which a data is added, and if it is directed to an access between the subscriber and to the network, the following two occasions are defined. As shown in FIG. 6, in the case of the access in which there is no data which is transferred to the subscriber terminal 111 through the customer premise network terminal equipment 120 in the ring of the customer premise network, the subscriber terminal 112 is a source of the data to which a predetermined data is added. In addition, the data is routed to the station switch 130 through the subscriber terminal 113. The customer premise network terminal equipment 120 and the subscriber oriented processing unit is set to a remote relay, and the subscriber terminal 113 of the one-to-multiple access is concurrently set as a relay and a copy, and is set as areal based on the terminal 114 which is not in the state of the one-to-multiple access.

In addition, as shown in FIG. 7, in the case of the access in which there is a data which is transferred to the subscriber terminal 111 through the customer premise network terminal equipment 120 based on the customer premise network ring, the subscriber terminal 112 is a source of a data to which a predetermined data is added, and when the data is routed to the subscriber terminal 111 through the customer premise network terminal equipment 120, the subscriber terminal 111 which is nearest to the subscriber terminal 111 which is a data generation source performs a drop function based on the customer premise network terminal equipment 120 among the subscriber terminals 111 and 113 based on the one-to-multiple access, and the remaining subscriber terminals 113 performs a copy function. The terminal 114 which is not performed based on the access performs a relay function. At this time, the customer premise network terminal equipment 120 is set concurrently to a remote relay and a local relay. The data transferred from the ring is routed concurrently to the ring and the station switch.

FIG. 8 is a block diagram illustrating a broadband network terminal equipment according to the present invention, and FIG. 9 is a view illustrating the construction of a data format for supporting a cell relay/add/drop operation for a broadband network terminal equipment according to the present invention. As shown in FIG. 8, the broadband network terminal equipment, namely, the customer premise network terminal equipment 120 according to the present invention includes a subscriber oriented processing unit 122, a network oriented processing unit 121, and a terminal equipment controller 123. The terminal equipment controller 123 includes a signal-cell access unit 202 for converting the signals from the subscriber oriented processing unit 122 and the network oriented processing unit 121 into an AAL type, a signal protocol processing unit 205 for extracting an access managing information from a signal data transferred from the signal cell access unit 202, an access managing unit 204 for converting the signal from the signal protocol processing unit 205 into an access managing type, a hardware controller 203 for initializing each block, monitoring the state of the block and controlling an alarm state, and a processor access controller 201 for receiving an information corresponding to the initialization and access of each block from the access managing unit 204 and the hardware controller 203 and reading and writing the data into each block in a type which is recognizable by the subscriber oriented processing unit 122 and the network oriented processing unit 121.

At this time, the access managing unit 204 performs a function for writing a VPI/VCI (Virtual Path Identifier/ virtual channel Identifier) for an access which becomes a basis for an initialization, namely, a meta signal into an access managing table of the subscriber oriented processing unit 122 through a processor access controller 201. In addition, when the VPI/VCI value corresponding to the initial access management from the terminal equipment controller 123, the subscriber oriented processing unit 122 and the network oriented processing unit 121 are initialized, each block becomes a state for normally receiving the data.

In addition, the subscriber oriented processing unit 122 includes a subscriber side physical hierarchy controller 217 forming a cell based on a bit stream data and outputting the same, a subscriber ATM hierarchy control and cell relay/add/drop unit 213 judging the type of a cell from the subscriber side physical hierarchy controller 217 and forming a predetermined path, a subscriber side input cell buffer 214 transferring a signal from the terminal equipment controller 123 to the subscriber ATM hierarchy control and cell relay/add/drop unit 213, a subscriber side remote relay buffer 215 transferring a signal from the network oriented processing unit 121 to the subscriber ATM hierarchy control and cell relay/add/drop unit 213, and a subscriber side signal cell buffer 216 storing the cell when the cell transferred from the subscriber side physical hierarchy controller 217 is a signal cell. The subscriber side physical hierarchy controller 217 includes a transceiver 219 for receiving and outputting a bit stream data and a subscriber physical hierarchy controller 218 for forming and outputting a cell based on the bit stream data from the transceiver 219.

In addition, the subscriber ATM hierarchy control and cell relay/add/drop unit 213 includes a physical hierarchy matching unit 225 for receiving a cell corresponding with a signal requested by the subscriber side physical hierarchy controller 217 and outputting the same, a header extraction unit 226 for extracting a header of 5 bytes among the cell transferred from the physical hierarchy matching unit 225, an access managing table 229 for storing and managing the access managing information, an access managing table controller 228 for converting the header of the cell from the header extracting unit 226 into a data recognizable by the access managing table 229, transferring to the access managing table 229 and extracting a cell type identifier and cell routing identifier, a header conversion and tag insertion unit 227 for inserting a new header into the cell payload from the header extracting unit 226, adding a routing tag of 3 bytes before the header and outputting a 56 bytes data, a cell controller 224 for extracting a cell type identifier and a cell routing identifier among the 3 bytes tags from the header conversion and tag insertion unit 227 and setting a routing direction, a maintenance cell processing unit 222 for processing the cell when the cell inputted into the cell controller 224 is a maintenance cell, a cell multiplexing unit 221 for receiving a signal from the subscriber-oriented processing unit 122 and outputting the same, a local relay buffer 223 for storing the cell to transmit the same to the cell multiplexing unit 221 when the cell type identified by the cell controller 224 is directed to a local relay, and a physical hierarchy matching unit 220 for performing a physical hierarchy operation for transmitting the signal from the cell multiplexing unit 221 to the subscriber side physical hierarchy processing unit 217.

The network oriented processing unit 121 includes a network side physical hierarchy controller 208 for forming a cell based on the bit stream data inputted from the network and outputting the same, a network ATM hierarchy control and cell relay/add/drop unit 207 for identifying the type of the cell transferred from the network side physical hierarchy controller 208 and routing to a proper path, a network side input cell buffer 206 for transferring the signal from the terminal equipment controller 123 to the network ATM hierarchy control and cell relay/add/drop unit 207, a network side remote relay buffer 211 for transferring the signal from the subscriber oriented processing unit 122 to the network ATM hierarchy control and cell relay/add/drop unit 207, and a network side signal cell buffer 212 for storing the cell when the cell from the network side physical hierarchy controller 208 is directed to a signal cell.

The operation of the customer premise network equipment 120 will be explained.

When the bit stream data is inputted from the transceiver 219, the subscriber physical hierarchy controller 218 forms a cell based on the bit stream data and transmits to the physical hierarchy matching unit 225 of the subscriber ATM hierarchy control and cell relay/add/drop unit 213. In addition, the physical hierarchy matching unit 225 receives the cell corresponding to the signal requested by the subscriber physical hierarchy controller 218 and transfers the same to the header extracting unit 226. The header extracting unit 226 extracts 5 bites headers of the cell and transfers to the access managing table controller 228. The access managing table controller 228 converts the header of the inputted cell into a data recognizable by the access managing table 229 and transfers to the access managing table 229 extracts a new header, a cell type routing identifier and a cell routing identifier and transfers the same to the header conversion and tag insertion unit 227. The header conversion and tag insertion unit 227 inserts a new header into the cell payload from the header extracting unit 226 and adds the rounding tags 251, 252, 253, 254, 255, 265, 266 of 3 bytes as shown in FIG. 9 before the header and transfers to the cell controller 224 in a 56 bytes form. The cell controller 224 extracts cell type identifier 251, 252, and 253 and cell routing identifiers 254 and 255 among the 3 bytes tag of the inputted data for thereby setting a rounding direction of the cell.

At this time, as the type of the cell type identifier, there are known a relay 251, a drop 252, and DIS 253. The cell routing identifier is directed to identifying the local relay 254 and the remote relay 255 when the cell type identifier CTI corresponds to the relay 251, and identifies the signal cell SIG 254 and the maintenance cell OAM 255 when the cell type identifier CTI is a drop 252. As a result of the recognition of the cell controller 224, the cell type identifier CTI is identified as a DIS 253, a corresponding cell is identified as a cell which is not registered into the access managing table 229 for thereby discarding the cell. If the cell type identifier CTI is a drop, the cell routing identifier CRI is searched, and it is determined whether the inputted cell is a signal cell 254 or a maintenance cell 255. If the cell type identifier CTI is a signal 254, the inputted signal is routed to the signal cell buffer 216 and is transferred to the signal cell access unit 202. If the cell type identifier CTI is a maintenance cell 255, the inputted signal is routed to the maintenance cell processing unit 222.

In addition, as a result of the identification of the cell controller 224, if the cell type identifier CTI is a relay, the cell routing identifier CRI is searched to be a remote relay, and if it is a local relay LR, the inputted signal is routed to the local relay buffer 223, and if it is a remote relay, the signal is routed into the remote relay buffer 211.

The signal cell routed to the subscriber side signal cell buffer 216 is converted into an AAL type 5 by the signal cell access unit 202 and is transferred to the signal protocol processing unit 205, and the signal protocol processing unit 205 extracts a serial number of the terminal connected with a signal data, a VPI/VCI value, and an access managing information and transfers the same to the access managing unit 204. The access managing unit 204 converts the data into the form of the access managing table 229 and transfers the data to the processor access controller 201 for thereby storing the data into the managing table 229.

In addition, the cell multiplexing unit 221 multiplexes the data inputted from the subscriber side remote relay buffer 215, the subscriber side input cell buffer 214, and the local relay buffer 223 by the unit of the cell and transfers to the physical hierarchy matching unit 220 for thereby routing to each subscriber terminal.

At this time, the network oriented processing unit 121 is operated identically to the subscriber oriented processing unit 122.

As shown in FIG. 9, the 56 bytes data format transferred to the cell controller 224 for supporting a cell relay/add/drop in the broadband network terminal equipment consists of 3 bytes routing tag areas 251, 252, 253, 254, 255, 265, and 266, a four bit CFC (Generic Flow Control) area 256, 8 bits VPI (Virtual Path Identifier areas 261 and 257, 16 bits VCI (Virtual Channel Identifier ) areas 262, 258 and 259, a 3 bits PTI (Payload Type Identifier) area 263, a 1 bit CLP (Cell Loss Priority) area 264 and a 48 byte cell payload area 260. The above-described configuration is implemented by adding a 3 byte routing tag to the basic 53 bytes cell format, and the 2 bytes 265 and 266 among 3 bytes tags are used later. Therefore, only one byte is used for a routing operation.

At this time, the cell type identifier CTI used for a one byte routing tag determines whether the cell is dropped or relayed. The cell routing identifier CRI determines whether the cell is a OAM cell or a signal cell in the case of the drop cell. In the case that the cell routing identifier CRI is a relay cell, the routing direction of the buffer is determined using lower 2 bits 254 and 255. In the case of the remote relay RR, it is routed to the network oriented processing unit (in the network orientation, in the case of the inputted cell, the subscriber oriented processing unit), and in the case of the local relay, it is routed to the local relay buffer 223 for thereby transferring the data to the subscriber terminal.

FIG. 10 is a block diagram illustrating a customer premise network according to the present invention, and FIG. 11 is a view illustrating a data format for supporting a cell relay/add/drop operation for a customer premise network according to the present invention. As shown in FIG. 10, the subscriber terminal according to the present invention includes a terminal controller 116, a subscriber data processing unit 117, an AAL processing unit 118, and a service access unit 119. The terminal controller 116 includes a signal cell access unit 304 for converting a signal from the subscriber data processing unit 117 into an AAL type 5 and outputting the same, a signal protocol processing unit 305 for extracting an access managing information from the signal data from the signal cell access unit 304, an access managing unit 303 for converting a signal from the signal protocol processing unit 305 into an access managing form, a hardware controller 302 for controlling the hardware of the subscriber terminal and a processor access controller 301 for receiving the signals from the access managing unit 303 and the hardware controller 302 and transferring to the subscriber data processing unit 117.

In addition, the subscriber data processing unit includes a physical hierarchy processing unit 306 for forming a cell based on a bit stream data and outputting the same, an ATM hierarchy control and cell relay/add/drop unit 309 for identifying the type of the cell from the physical hierarchy processing unit 306 and routing to a proper path, a signal cell buffer 324 for storing the cell in the case that the type of the cell from the physical hierarchy processing unit 306 is a signal cell, a user cell buffer 323 for storing the cell in the case that the type of the cell from the physical hierarchy processing unit 306 is a user cell, a high priority buffer 321 and a low priority buffer 322 for storing the cells based on the priority of the cell from the physical hierarchy processing unit 306, a first buffer 319 for storing the cells from the terminal controller 116, and a second buffer 320 for storing the cells from the AAL processing unit 118.

At this time, the physical hierarchy processing unit 306 includes a transceiver 307 for receiving a bit stream data, and a subscriber physical hierarchy controller 308 for forming a cell based on a bit stream data from the transceiver 307 and outputting the same. The ATM hierarchy control and cell relay/add/drop unit 309 includes a physical hierarchy matching unit 314 for receiving a cell corresponding to the signal requested by the physical hierarchy processing unit 306 and outputting the same, a header extracting unit 315 for extracting 5 bytes header from the cell from the physical hierarchy matching unit 314, an access managing table 318 for storing and managing the access managing information, an access managing table controller 317 for converting the cell header from the header extracting unit 315 into a data recognizable by the access managing table 318, transferring the data to the access managing table 318 and extracting a cell type identifier and a cell routing identifier, a header conversion and tag insertion unit 316 for inserting a new header to the cell payload from the header extracting unit 315, adding the 3 bytes routing tag before the header and outputting a 56 bytes data, a cell controller 313 for extracting a cell type identifier and a cell routing identifier from the 3 bytes data tag from the header conversion and tag insertion unit 316 and setting a routing direction of the cell, a maintenance cell processing unit 312 for processing the cell when the cell inputted into the cell controller 313 is a maintenance cell, a cell multiplexing unit 311 for multiplexing the signal from the subscriber data processing unit 117, and a physical hierarchy matching unit 310 for performing a physical hierarchy operation for transferring the signal from the cell multiplexing unit 311 to the physical hierarchy processing unit 306.

The function of the subscriber terminal will be explained.

First, when a bit stream data is inputted from the transceiver 307 of the physical hierarchy processing unit 306, the subscriber physical hierarchy controller 308 forms a cell based on a bit stream data and transfers to the physical hierarchy matching unit 314 of the ATM hierarchy control and cell relay/add/drop unit 309. The physical hierarchy matching unit 314 receives a signal requested by the subscriber hierarchy controller 308 and transfers the same to the header extracting unit 315. The header extracting unit 315 extracts a 5 bytes header of the inputted cell and transfers the same to the access managing table controller 317. The access managing table controller 317 converts the header of the cell into a data recognizable by the access managing table 316 and transfers the same to the access managing table 318. In addition, the access managing table controller 317 extracts a cell type identifier and a cell routing identifier and transfers to the header conversion and tag insertion unit 316. The header conversion and tag insertion unit 316 inserts a new header to the cell payload from the header extracting unit 315 and adds the 3 bytes routing tags 351, 352, 353, 354, 355, 356, 357, 366 and 367 shown in FIG. 11 before the header and then transfers the same to the cell controller 313 in the data form. The cell controller 313 extracts a cell type identifier CTI and a cell routing identifier CRI among the 3 bytes tags of the inputted data for thereby setting a routing direction of the cell. The cell controller 313 determines whether the inputted cell is a drop cell, a relay cell, or a copy cell which is copied at the time when the drop cell is relayed using the cell type identifier for thereby routing to a proper direction.

As shown in FIG. 11, the 56 bytes data format used for a routing in the cell controller is the type that the 3 bytes routing tags 351, 352, 353, 354, 355, 356, 357, 366 and 367 are added to the basic 53 bytes cell format. 2 bytes 366 and 367 among the 3 bytes tags are left for the use in the future, and 1 byte is used for the routing. At this time, the cell type identifier CTI determines whether the cell is a drop 352 or a relay 351. In the case of the drop cell 352, the cell routing identifier CRI determines the OAM cell 355, the signal cell 354, and the user cell 354 transferred to the AAL processing unit 118. In addition, in the case that the cell routing identifier CRI is a delay cell 351, the routing direction of the buffer is determined using the lower 2 bits 356 and 357. In the case of the high priority cell (HPC), the HPC 357 is set to "1" and is routed to the high priority buffer 321. In the case of the low priority cell (LPC), the LPC 356 is set to "1" and is routed to the low priority buffer 322.

At this time, if the inputted cell is a cell DIS which is not registered into the access managing table 318, the cell controller 313 recognizes the cell as a cell transferred to another subscriber terminal for thereby routing to the high priority buffer 321 among the relays. Namely, the cell which is not registered into the access managing table 318 of the cell controller 313 is not discarded and then is routed to the high priority buffer 321 for the reason that if all accesses with respect to the cells transferred to each subscriber terminal are registered into the access managing table 318, a lot amount of access managing tables is needed. The cells are allocated to the high priority buffer 321 for the reason that since the cell is transferred to the other subscriber terminal for thereby preventing a cell loss.

The signal cell routed to the signal cell buffer 324 is converted into an AAL type 5 by the signal cell access unit 304 and is transferred to the signal protocol processing unit 305, and the signal protocol processing unit 305 extracts the VPI/VCI value set based on the signal data and the access managing information (cell type identifier and cell routing identifier) and transfers to the access managing unit 303. Thereafter, the access managing unit 303 converts the data into a data for the access managing table 318 and the data are transferred to the processor access unit 301 and are stored into the access managing table 318.

In addition, the cell multiplexing unit 311 multiplexes the cell transferred to the maintenance cell processing unit 312, the cell of the first buffer 319 into which the cell from the signal cell access unit 304 is stored, the cell stored in the high priority buffer 321, the cell stored in the low priority buffer 322, and the cell of the second buffer 320 into which the cell from the AAL processing unit 118 is stored for thereby transferring the cells to the physical hierarchy matching unit 310.

As described above, in the present invention, it is possible to overcome a high cost problem encountered in the conventional one-to-one access and to provide a better service using a simple construction of terminal without using a customer premise network terminal equipment when it is needed to increase the terminal, so that a broadband service is available at a lower cost. In addition, it is possible to provide a service by implementing a simple construction of the terminal by connecting a plurality of terminals using a single ring, and an additional port and a broadband network terminal equipment are not needed for thereby minimizing the cost and decreasing the length of the line.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a customer premise network equipment which is directed to providing a customer premise network or a subscriber with a B-ISDN (Broadband Integrated Service Digital Network), wherein the improved equipment comprises:

a plurality of subscriber terminals connected as one of one-to-one, one-to-multiple, and broadcast type between a network and a subscriber by a single ring, each of said subscriber terminals including:
  a terminal controller for controlling a protocol and signal access transmitted through the subscriber terminals;
  a service access unit interfacing with a direct service in accordance with a control of the terminal controller;
  a subscriber data controller for processing data from the ring and performing a relay/drop/copy function; and
  an AAL processing unit for;
matching the cell dropped by the subscriber data processing unit with a proper type of a service type,
transferring the matched cell to the service access unit and disassembling a service data requested by the service access unit into an ATM cell type;
each of said subscriber terminal including:
  a drop function for transferring data from an ATM hierarchy to an upper hierarchy;
  an add function for transferring the data from the upper hierarchy to the ATM hierarchy;
  a relay function for feeding-back the data from the ATM hierarchy to a physical hierarchy;
  a copy function for concurrently performing the drop and relay functions; and customer premise network terminal equipment connected by a single ring for receiving a one-to-one protocol,
implementing communication between the subscriber terminals; and providing access between the subscriber terminal and the network.

2. The equipment of claim 1, wherein said terminal controller further comprises:
  a signal cell access unit for converting a signal from the subscriber data processing unit into an AAL type 5;
  a signal protocol processing unit for extracting access managing information from the signal cell access unit;
  an access managing unit for converting a signal from the signal protocol processing unit into access managing form;
  a hardware controller for controlling the hardware of the subscriber terminal; and
  a processor access controller for receiving the signals from the access managing unit and the hardware controller and transferring said signals to the subscriber data processing unit.

3. The equipment of claim 1, wherein said subscriber data processing unit further comprises:
  a physical hierarchy processing unit for forming a cell based on bit stream data;
  an ATM hierarchy control and cell relay/add/drop unit for recognizing a cell type from the physical hierarchy processing unit and routing said recognized cell type to a proper path;
  a signal cell buffer for storing a signal when the cell from the physical hierarchy processing unit is a signal cell;
  a user cell buffer for storing a cell when the cell from the physical hierarchy processing unit is a user cell;
  a high priority buffer and a low priority buffer for storing the cells in accordance with a priority of the cell from the physical hierarchy processing unit;
  a first buffer for storing the cell from the terminal controller; and
  a second buffer for storing the cell from the ALL processing unit.

4. The equipment of claim 3, wherein said physical hierarchy processing unit further comprises:
  a transceiver for receiving and outputting bit stream data; and
  a subscriber physical hierarchy controller for forming bit stream data from the transceiver.

5. The equipment of claim 3, wherein said ATM hierarchy control and cell relay/add/drop unit further comprises:
  a first physical hierarchy matching unit for receiving a cell corresponding with the signal requested by the physical hierarchy processing unit;
  a header extracting unit for extracting a 5 byte header among the cell from the first physical hierarchy matching unit;
  an access managing table for storing and managing the access managing information;
  an access managing table controller for converting the header of the cell from the header extracting unit into data recognizable by the access managing table, transferring to the access managing table, and extracting a cell type identifier and a cell routing identifier;
  a header conversion and tag insertion unit for inserting a new header into the cell payload from the header extracting unit and for adding a 3 byte routing tag before the headers and outputting 56 bytes of data;
  a cell controller for extracting a cell type identifier and a cell routing identifier among the 3 byte tag of the data from the header conversion and tag insertion unit and setting a cell routing direction;
  a maintenance cell processing unit for processing the cell when the cell inputted from the cell controller is a maintenance cell;
  a cell multiplexing unit for receiving a signal from the subscriber data processing unit; and
  a second physical hierarchy matching unit for performing a physical hierarchy operation for transferring the signal from the cell multiplexing unit to the physical hierarchy processing unit.

6. The equipment of claim 5, wherein said cell controller includes:
  a means for routing a cell to the high priority buffer for transferring the cell to another subscriber terminal when the cell inputted is not registered into the access managing table;
  a means for routing the cell to the signal cell buffer when the inputted cell is a drop cell and a signal cell;
  a means for routing the cell to the user cell buffer when the inputted cell is a drop cell and a user cell and routing the cell to the maintenance cell processing unit when the inputted cell is a drop cell and a maintenance cell; and
  a means for routing the cell to the high priority buffer when the inputted cell is a high priority cell by checking the priority of the cell and routing the cell to the low priority buffer when the inputted cell is a low priority cell.

7. The equipment of claim 1, wherein said customer premise network terminal equipment further comprises:
  a subscriber oriented processing unit for supporting an internal communication between the intra-network subscribers, transferring the data requested by the subscriber terminal, and transferring the data from the network to each subscriber and simultaneously terminating the protocol;

a network oriented processing unit for terminating the inter-network protocol, transferring the data requested to be transferred to each subscriber by the network to the subscriber oriented processing unit, transferring the data requested by the subscriber oriented processing unit to the network; and a terminal equipment controller for controlling the operations of the network oriented processing unit and the subscriber oriented processing unit and controlling a signal function from the network and the subscriber terminal.

8. The equipment of claim 7, wherein said terminal equipment controller includes:

a signal cell access unit for converting the signals from the subscriber oriented processing unit and the network oriented processing unit into an AAL type 5;

a signal protocol processing unit for extracting an access managing information from the signal data from the signal cell access unit and outputting the same;

an access managing unit for converting the signal from the signal protocol processing unit into an access managing form;

a hardware controller for initializing each block, monitoring the state of the blocks and controlling an alarm state of the system; and a processor access controller for receiving an information corresponding to the initialization and access of each block from the access managing unit and the hardware controller and reading and writing the data from/into each block in a form recognizable by the subscriber oriented processing unit and the network oriented processing unit.

9. The equipment of claim 7, wherein said subscriber oriented processing unit includes:

a subscriber side physical hierarchy controller for forming a cell based on a bit stream data and outputting the same;

a subscriber ATM hierarchy control and cell relay/add/drop unit for recognizing the type of the cell from the subscriber side physical controller and routing to a predetermined path;

a subscriber side input cell buffer for transferring the signal from the terminal equipment controller to the subscriber ATM hierarchy control and cell relay/add/drop unit;

a subscriber side remote relay buffer for transferring the signal from the network oriented to the subscriber ATM hierarchy control and cell relay/add/drop unit; and a subscriber side signal cell buffer for storing a cell when the cell from the subscriber side physical hierarchy controller is a signal cell.

10. The equipment of claim 9, wherein said subscriber side physical hierarchy controller includes:

a transceiver for receiving and outputting a bit stream data; and a subscriber physical hierarchy controller for forming a cell based on a bit stream data from the transceiver and outputting the same.

11. The equipment of claim 9, wherein said subscriber ATM hierarchy control and cell relay/add/drop unit further comprises:

a first physical hierarchy matching unit for receiving a cell corresponding to the signal requested by the subscriber side physical hierarchy controller;

a header extracting unit for extracting a 5 byte header among the cell from the first physical hierarchy matching unit;

an access man-aging table for storing and managing the access managing information;

an access managing table controller fork converting the header of the cell from the header extracting into data recognizable by the access managing table, transferring said data to the access managing table, and extracting a cell type identifier and a cell routing identifier;

a header conversion and tag insertion unit for inserting a new header into the cell payload from the header extracting unit, adding a 3 byte routing tag before the header, and outputting a 56 bytes data form;

a cell controller for extracting a cell type identifier and a cell routing identifier among the 3 byte tag of the data from the header conversion and tag insertion unit and setting a cell routing direction;

a maintenance cell processing unit for processing a cell when the cell input from the cell controller is a maintenance cell;

a cell multiplexing unit for receiving a signal from the subscriber oriented processing unit and multiplexing the received signal;

a local relay buffer for storing the cell for transferring to the cell multiplexing unit when the cell type recognized by the cell controller is a local relay; and a second physical hierarchy matching unit for performing a physical hierarchy operation for transferring the signal from the cell multiplexing unit to the subscriber side physical hierarchy processing unit.

12. The equipment of claim 7, wherein said network oriented processing unit further comprises:

a network side physical hierarchy controller for forming a cell based on bit stream data from the network;

a network ATM hierarchy control and cell relay/add/drop unit for recognizing the type of cell from the network side physical hierarchy controller and routing to a predetermined network;

a network side input cell buffer for transferring the signal from the terminal equipment controller to the network ATM hierarchy control and cell relay/relay/add/drop unit;

a network side relay buffer for transferring the signal from the subscriber oriented processing unit to the network ATM hierarchy control and cell relay/add/drop unit; and a network side signal cell buffer for storing a cell when a network side signal cell buffer for storing a cell when the type of the cell from the network side physical hierarchy controller is a signal cell.

13. The equipment of claim 11, wherein said cell controller further comprises:

a means for discarding a signal when the inputted cell is not registered in the access managing table;

a means for routing the cell to the subscriber side signal cell buffer when the inputted cell is a drop cell and a maintenance cell; and a means for routing the cell to the local relay buffer when the inputted cell is a relay cell, and the relay cell is judged to be a local relay or a remote relay and routing to the network oriented processing unit for transferring to the network when the relay cell is a remote relay cell.

* * * * *